United States Patent
Talla et al.

(10) Patent No.: US 10,516,621 B2
(45) Date of Patent: Dec. 24, 2019

(54) SYSTEMS AND METHODS TO MINIMIZE PACKET DISCARD IN CASE OF SPIKY RECEIVE TRAFFIC

(71) Applicant: Citrix Systems, Inc., Fort Lauderdale, FL (US)

(72) Inventors: Ramanjaneyulu Talla, Bangalore (IN); Anshul Kumar, Bangalore (IN); Narendra Kataria, Santa Clara, CA (US)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 36 days.

(21) Appl. No.: 15/719,232

(22) Filed: Sep. 28, 2017

(65) Prior Publication Data

US 2019/0097938 A1 Mar. 28, 2019

(51) Int. Cl.
*H04L 12/823* (2013.01)
*H04L 12/805* (2013.01)
*H04L 12/835* (2013.01)

(52) U.S. Cl.
CPC .............. *H04L 47/32* (2013.01); *H04L 47/30* (2013.01); *H04L 47/365* (2013.01)

(58) Field of Classification Search
CPC ........ G06F 5/10; G06F 12/0875; G06F 5/065; H04L 12/4625; H04L 47/525; H04L 47/527; H04L 47/568; H04L 47/6225; H04L 47/623; H04L 49/602; H04L 49/90; H04L 49/901; H04L 49/9021; H04L 49/9057; H04L 49/9094; H04L 47/50; H04L 41/5022; H04L 49/3018; H04L 49/351; H04L 49/354
See application file for complete search history.

(56) References Cited

U.S. PATENT DOCUMENTS

| | | | | |
|---|---|---|---|---|
| 6,112,267 A | * | 8/2000 | McCormack | G06F 12/08 710/52 |
| 6,393,532 B1 | * | 5/2002 | Takada | H04L 12/5601 710/52 |
| 6,714,553 B1 | * | 3/2004 | Poole | H04L 12/4625 370/412 |
| 7,533,237 B1 | * | 5/2009 | Nordquist | G06F 12/0284 711/100 |
| 2007/0245074 A1 | * | 10/2007 | Rosenbluth | G06F 5/10 711/110 |
| 2018/0232328 A1 | * | 8/2018 | Lassen | G06F 13/1673 |

* cited by examiner

*Primary Examiner* — Jung Liu
(74) *Attorney, Agent, or Firm* — Foley & Lardner LLP; Christopher J. McKenna; Daniel Rose

(57) ABSTRACT

Described embodiments provide for minimizing packet discarding in case of spiky traffic reception by using adaptive buffers. Transmission buffers may be adjusted based on traffic behavior, with the buffer size dynamically expanding or shrinking as needed, providing a cushion to hold extra packets when a buffer drain rate is slower than the buffer arrival rate.

18 Claims, 5 Drawing Sheets

SYSTEMS AND METHODS TO MINIMIZE PACKET DISCARD IN CASE OF SPIKY RECEIVE TRAFFIC

FIELD OF THE DISCLOSURE

The present application generally relates to buffer management in network interfaces.

BACKGROUND OF THE DISCLOSURE

Packet processing systems typically transfer packets between network interface card hardware buffers and transmit (tx) and receive (rx) buffers based on polling of the buffer levels or periodic interrupts. However "spikes" or surges in traffic transiting the buffers may occur, due to internal (application delays, processor delays, etc.) or external (network congestion, transmission errors, etc.) causes. For example, if traffic is stalled by an external intermediary device and then released, it may arrive in a reception rush or spike or a number of packets n per time t greatly exceeding an average rate. Conversely, a spike may also result from the buffer not being emptied as quickly as traffic is received: if there are not enough CPU cycles to drain the received packets from the network interface hardware queue, or if the draining rate is slower than the arrival rate, then the buffer may effectively experience a traffic spike. Thus, a spike may refer to an increase in data being buffered, caused by traffic arriving at an increased rate, and/or traffic being drained from a buffer at a decreased rate. Similarly, spikes may occur in transmission buffers, with data "received" from internal applications for transmission to external devices. Accordingly, spikes in "received" traffic may refer to traffic flows transiting a network interface and buffers in either direction, and may refer to the traffic being received at the buffer, regardless of internal or external source.

In many instances, the buffers are unable to cope with this increase in data, and as a result, newly arriving packets may be dropped. Various attempts to mitigate this issue include dropping packets having a lowest priority or by other such metrics, but this requires retransmission, additional latency, increased bandwidth requirements, and may result in unpredictable system behavior.

BRIEF SUMMARY OF THE DISCLOSURE

The systems and methods discussed herein provide for minimizing packet discarding in case of spiky traffic reception by using adaptive buffers. Transmission buffers may be adjusted based on traffic behavior, with the buffer size dynamically expanding or shrinking as needed, providing a cushion to hold extra packets when a buffer drain rate is slower than the buffer arrival rate.

In one aspect, the present disclosure is directed to a system for adaptive buffer size management. The system includes a network interface comprising a packet buffer having at least a first predetermined size. The system also includes a buffer manager configured to: determine that a packet is present in the packet buffer at a position corresponding to the first predetermined size from a tail of the buffer, and responsive to the determination, increase the size of the packet buffer by a predetermined value.

In some implementations, the buffer manager is further configured to: subsequently determine that a packet is absent from the packet buffer at the position corresponding to the first predetermined size from the tail of the buffer; and responsive to the determination, reduce the size of the packet buffer to the first predetermined size. In a further implementation, the buffer manager is further configured to reduce the size of the packet buffer by a multiple of the predetermined value to equal the first predetermined size.

In some implementations, the buffer manager is further configured to: subsequently determine that a packet is absent from the packet buffer at the position corresponding to the first predetermined size from the tail of the buffer; and responsive to the determination, reduce the size of the packet buffer by the predetermined value.

In some implementations, the packet buffer comprises a ring buffer. In a further implementation, the buffer manager is further configured to increase the size of the packet buffer by increasing the ring size. In some implementations, the buffer manager is further configured to increase the size of the packet buffer by the first predetermined size. In some implementations, the buffer manager is further configured to wait a predetermined period before subsequently determining whether a packet is present in or absent from the packet buffer at the position corresponding to the first predetermined size from the tail of the buffer.

In some implementations, the network interface lacks hardware flow control. In some implementations, the buffer manager is further configured to increase the size of the packet buffer by the predetermined value, responsive to a determination a flow control of the connection is disabled.

In another aspect, the present disclosure is directed to a method for adaptive buffer size management. The method includes determining, by a buffer manager of a device, that a packet is present in a packet buffer of a network interface having a first predetermined size at a position corresponding to the first predetermined size from a tail of the buffer, and responsive to the determination, increasing the size of the packet buffer, by the buffer manager, by a predetermined value.

In some implementations, the method includes subsequently determining, by the buffer manager, that a packet is absent from the packet buffer at the position corresponding to the first predetermined size from the tail of the buffer; and responsive to the determination, reducing the size of the packet buffer, by the buffer manager, to the first predetermined size. In a further implementation, reducing the size of the packet buffer further comprises reducing the size of the packet buffer, by the buffer manager, by a multiple of the predetermined value to equal the first predetermined size.

In some implementations, the method includes subsequently determining, by the buffer manager, that a packet is absent from the packet buffer at the position corresponding to the first predetermined size from the tail of the buffer; and responsive to the determination, reducing the size of the packet buffer, by the buffer manager, by the predetermined value.

In some implementations, the packet buffer comprises a ring buffer. In a further implementation, the method includes increasing the size of the packet buffer by increasing the ring size.

In some implementations, the method includes increasing the size of the packet buffer by increasing the size of the packet buffer, by the buffer manager, by the first predetermined size. In some implementations, the method includes waiting a predetermined period, by the buffer manager, before subsequently determining whether a packet is present in or absent from the packet buffer at the position corresponding to the first predetermined size from the tail of the buffer.

In some implementations, the network interface lacks hardware flow control. In some implementations, the method includes increasing the size of the packet buffer responsive to a determination a flow control of the connection is disabled.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
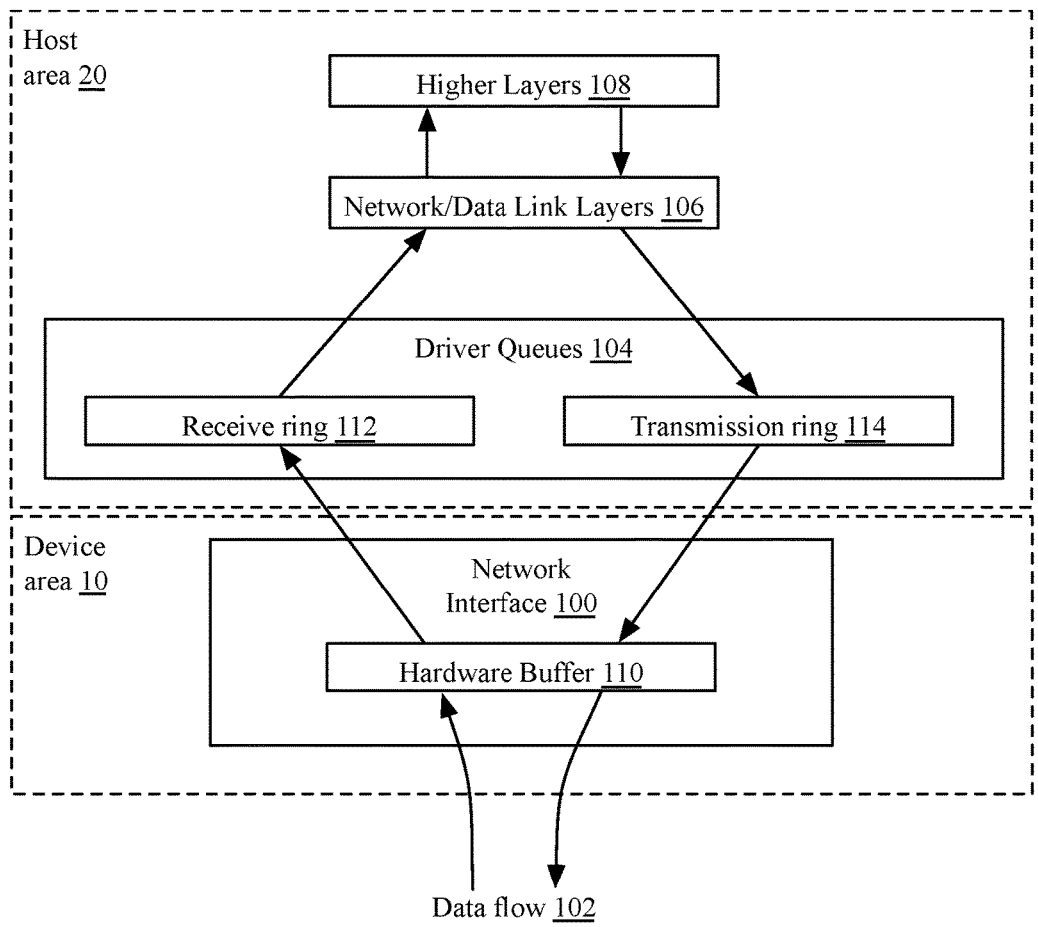
FIG. 1A is a block diagram of data flow through buffers of a network stack, according to one implementation.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

Packet processing systems typically transfer packets between network interface card hardware buffers and transmit (tx) and receive (rx) buffers based on polling of the buffer levels or periodic interrupts. However "spikes" or surges in traffic transiting the buffers may occur, due to internal (application delays, processor delays, etc.) or external (network congestion, transmission errors, etc.) causes. For example, if traffic is stalled by an external intermediary device and then released, it may arrive in a reception rush or spike or a number of packets n per time t greatly exceeding an average rate. Conversely, a spike may also result from the buffer not being emptied as quickly as traffic is received: if there are not enough CPU cycles to drain the received packets from the network interface hardware queue, or if the draining rate is slower than the arrival rate, then the buffer may effectively experience a traffic spike. Thus, a spike may refer to an increase in data being buffered, caused by traffic arriving at an increased rate, and/or traffic being drained from a buffer at a decreased rate. Similarly, spikes may occur in transmission buffers, with data "received" from internal applications for transmission to external devices. Accordingly, spikes in "received" traffic may refer to traffic flows transiting a network interface and buffers in either direction, and may refer to the traffic being received at the buffer, regardless of internal or external source.

In many instances, the buffers are unable to cope with this increase in data, and as a result, newly arriving packets may be dropped. Various attempts to mitigate this issue include dropping packets having a lowest priority or by other such metrics, but this requires retransmission, additional latency, increased bandwidth requirements, and may result in unpredictable system behavior.

For example, FIG. 1A is a block diagram of data flow 102 through buffers 110, 112, 114, of a network stack, according to one implementation. As shown, a network stack may include a device area 10, comprising one or more network interfaces 100; and a host area 20, comprising kernel and user level segments, such as a driver 104 and higher layers 106, 108 of the network stack including data link layer 2, network layer 3, transport layer 4, presentation layer 5, session layer 6, and application layer 7. The network interface 100 may include a hardware buffer 110, which may frequently be of a fixed length. Incoming data may be placed into the hardware buffer 110. The data may be withdrawn by a driver to replenish a receive buffer 112 of a driver queue 104. Receive buffer 112 may frequently comprise a ring buffer, and thus may be referred to as a receive ring 112. Similarly, outgoing data may be placed into a transmission buffer or transmission ring 114 of the driver queues 104. Although one each of buffers 112, 114 are shown, in some implementations, multiple buffers may exist (e.g. for different priorities of packets, different socket buffers, etc.).

Packets may be drawn from the hardware buffer 110 of the network interface 100 and placed into the receive queue 112 based on processing speeds and quotas. Similarly, packets may be placed into the transmission queue 114 from applications and processes higher up the network stack for eventual transfer into the hardware buffer 110. If the receive queue 112 or transmission queue 114 is full due to spikes, then more I/O cycles are needed to properly drain the queues. If this cannot be done in time, then packets may be dropped (or, in some implementations, overwritten in the ring buffers prior to their withdrawal).

For example, in many implementations, the receive ring size may be fixed at 512 bytes, which may not be sufficient to provide a cushion to hold additional received packets when the drain rate from the receive ring is slower than the arrival rate of packets at the hardware buffer 110. One solution is to simply increase the size of the ring, such as to 2 Kbytes or 4 Kbytes. However, this may lead to performance drops due to descriptors and metadata of data buffers being unavailable in the cache between replenishing the buffers and receive processing when a greater number of interfaces are involved.

Instead, the systems and methods discussed herein provide for minimizing packet discarding in case of spiky traffic reception by using adaptive buffers. Transmission buffers may be adjusted based on traffic behavior, with the buffer size dynamically expanding or shrinking as needed, providing a cushion to hold extra packets when a buffer drain rate is slower than the buffer arrival rate.

Figure 1B:
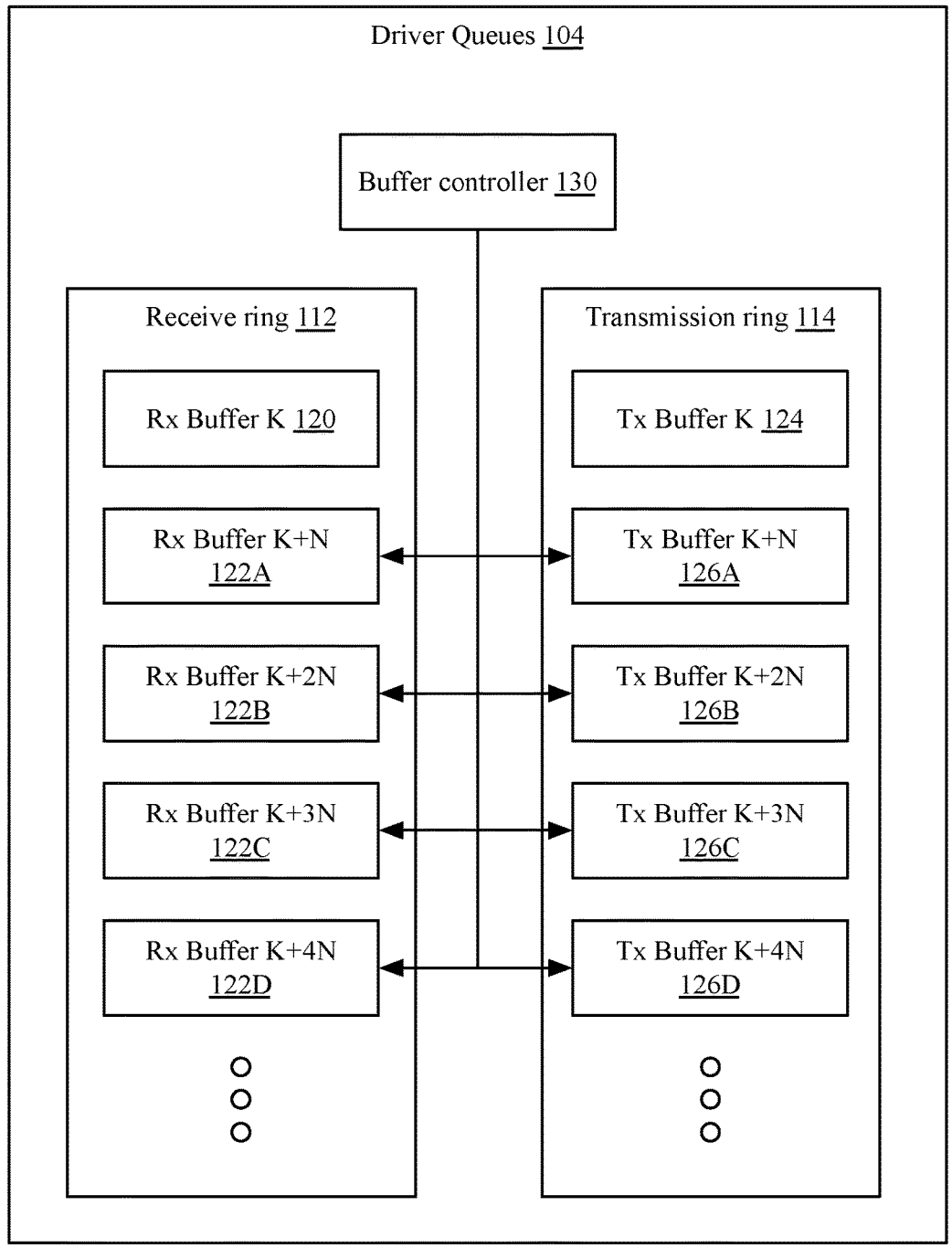
FIG. 1B is a block diagram of an adaptive buffer management system, according to one implementation.

FIG. 1B is a block diagram of an adaptive buffer management system, according to one implementation. As shown, the driver may maintain one or more receive queues 112 and one or more transmission queues 114, which may comprise ring buffers, first-in/first-out (FIFO) buffers, or similar data structures. The buffers may be implemented in any type and form of memory storage or circuit, such as NAND- or NOR-based Flash memory, SDRAM, EDO/FPMS, RLDRAM, SRAM, or any other type and form of memory.

As shown, receive ring 112 and/or transmission ring 114 may be logically divided into a plurality of buffer portions or sub-buffers 120-126. In implementations of the adaptive buffer method and system discussed herein, the total buffer size may be fixed (e.g. at 2K bytes, 4K bytes, 8K bytes, or any other such size), but sub-buffers may be dynamically enabled or disabled by a buffer controller 130. Accordingly, at any time, one or more sub-buffers may be active or enabled, and between zero and all except one buffer may be disabled or inactive.

In some implementations, sub-buffers 122A-126N and 126A-126N may be the same size (e.g. size N as shown), or may be different sizes (for example, a first sub-buffer 122A may be 128 B, a next sub-buffer 122B may be 256 B, etc.). The first or default buffer (e.g. 120, 124) may have the same size or a different size (e.g. size K may be equal to N or a different size).

In operation, the buffer controller 130 may monitor the arrival rate of packets to the ring buffers and/or hardware buffer of the network interface, and the drain rate of packets from the ring buffers. If the drain rate exceeds the arrival rate, the buffer controller may disable or inactivate sub-buffers down to the initial buffer 120, 124. If the arrival rate exceeds the drain rate, the buffer controller may activate or enable additional sub-buffers 122, 126.

Accordingly, rather than utilizing a larger fixed buffer size, performance may be increased by dynamically sizing the buffers, keeping the control area of socket buffers in cache memory.

Figure 1C:
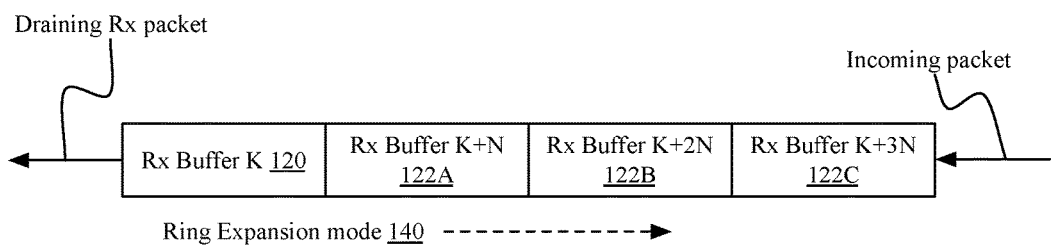
FIG. 1C is a diagram of buffer expansion, according to one implementation.
Figure 1D:
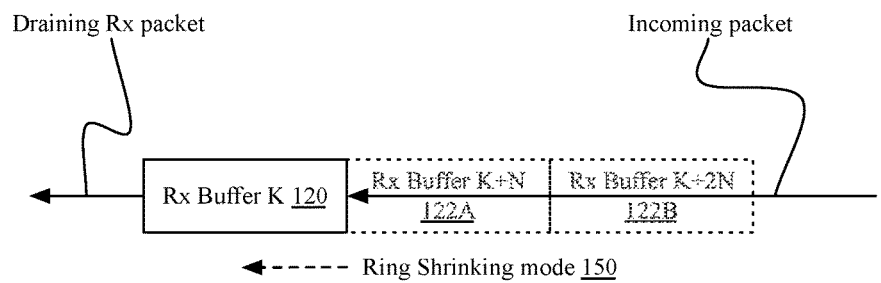
FIG. 1D is a diagram of buffer shrinking, according to one implementation.

FIG. 1C is a diagram of buffer expansion, and FIG. 1D is a diagram of buffer shrinking, according to some implementations. Incoming packets may be added to the end or tail of active portions of the ring buffer, and outgoing packets may be drained from the head of the active portion. The "head" of the ring may thus be advanced through the buffer as each packet is drained, and accordingly, may refer to a read pointer rather than a specific or predefined memory address. The "tail" may be positioned at a predetermined size from the head, e.g. K Bytes. A write pointer (not illustrated) may be within the active portion of the ring, ahead of the tail.

As shown in FIG. 1C, the buffer may be expanded in mode 140 by enabling additional sub-buffers 122A, 122B, 122C, etc. This may be accomplished in one implementation advancing the tail of the active portion of the buffer by a predetermined number of bytes N (respectively N, 2N, 3N, etc.).

Similarly, as shown in FIG. 1D, the buffer may be shrunk in mode 150 by disabling or deactivating sub-buffers 122A, 122B, etc. This may be accomplished in one implementation by retracting the tail of the active portion of the buffer by a predetermined number of bytes N (respectively N, 2N, 3N, etc.). In some implementations, the tail may be retracted by all advanced buffers N or resetting the tail to the end of the initial buffer 120, as shown. This may be done, for example, because all buffered packets are drained, such that retracting the tail does not result in loss of any undrained packets. In another implementation, the buffer may be shrunk by advancing the head of the buffer without advancing the tail. For example, the head may be advanced by the size of sub-buffers 122 that are being deactivated (e.g. N, 2N, 3N, etc.) without advancing the tail, resulting in the buffer being shrunk to K bytes (or K+N, or K+2N, etc., implementations in which the buffer is not shrunk completely).

In some implementations, the buffer controller may measure the receive rate and drain rate directly. In other implementations, the buffer controller may determine a difference between the receive rate and drain rate by checking for a packet descriptor at a distance K from the tail of the buffer. This may be done, for example, after a number of packets are drained from the buffers or processed, and before replenishment of the buffer (e.g. from the network interface hardware buffer or from higher in the network stack). If a packet is present in the buffer, then not all packets have been drained, and accordingly, the receive rate is greater than the drain rate. Accordingly, the controller may expand the buffer size by activating sub-buffers or moving the tail of the buffer. Conversely, if no packets are present, the buffer size may be decreased as discussed above.

In order to avoid oscillating between expanding mode 140 and shrinking mode 150, in some implementations, the controller may only apply shrinking mode after expiration of a predetermined amount of time from a previous application of shrinking or expanding (e.g. 200 ms, 400 ms, or any other such time).

Figure 2:
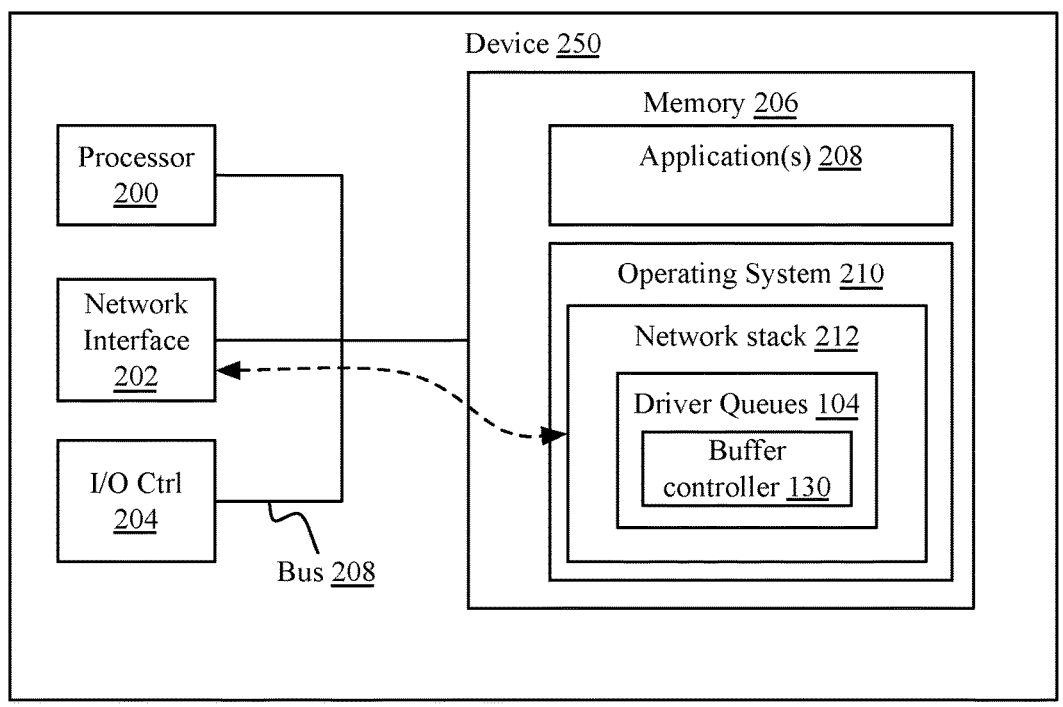
FIG. 2 is a block diagram of an embodiment of a computing device for adaptive buffer size management.

FIG. 2 is a block diagram of an embodiment of a computing device 250 for adaptive buffer size management. Devices 250 may comprise any type and form of computing devices, including laptop computers, desktop computers, rackmount computers, tablet computers, wearable computers, appliances, cluster devices or appliances, server clouds or farms, virtual machines executed by one or more physical machines, or any other type of computing device. As shown in FIG. 2, a computing device 250 may include one or more central processing units or processors 200, one or more network interfaces 202, one or more input/output controllers or devices 204, one or more memory units 206 which may include system memory such as RAM as well as internal or external storage devices. A computing device may also include other units not illustrated including installation devices, display devices, keyboards, pointing devices such as a mouse, touch screen devices, or other such devices. Memory 206 may include, without limitation, an operating system 210 and/or software.

The central processing unit 200 is any logic circuitry that responds to and processes instructions fetched from the memory 206. In many embodiments, the central processing unit 200 is provided by a microprocessor unit, such as: those manufactured by Intel Corporation of Mountain View, Calif.; those manufactured by International Business Machines of White Plains, N.Y.; or those manufactured by Advanced Micro Devices of Sunnyvale, Calif. The computing device 100 may be based on any of these processors, or any other processor capable of operating as described herein.

Memory 206, sometimes referred to as a main memory unit, may be one or more memory chips capable of storing data and allowing any storage location to be directly accessed by the microprocessor 200, such as any type or variant of Static random access memory (SRAM), Dynamic random access memory (DRAM), Ferroelectric RAM (FRAM), NAND Flash, NOR Flash and Solid State Drives (SSD). The memory 206 may be based on any of the above described memory chips, or any other available memory chips capable of operating as described herein. In the embodiment shown, the processor 200 communicates with main memory 206 via a system bus 208 (described in more detail below). In other embodiments, the processor communicates directly with main memory 206 via a memory port. For example, in such embodiments, the memory 206 may be DRDRAM. In other embodiments, processor 200 may communicate directly with cache memory via a secondary bus, sometimes referred to as a backside bus. In other embodiments, the main processor 200 communicates with cache memory using the system bus 208. Cache memory typically has a faster response time than memory accessible via a system bus, and is provided by, for example, SRAM, BSRAM, or EDRAM.

In some embodiments, the processor 200 communicates with various I/O devices 204 via local system bus 208. Various buses may be used to connect the central processing unit 200 to any I/O devices, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display, the processor 200 may use an Advanced Graphics Port (AGP) to communicate with the display. In some embodiments, the processor 200 may communicate directly with I/O devices, for example via HYPERTRANSPORT, RAPIDIO, or INFINIBAND communications technology. A wide variety of I/O devices may be present in the computing device 250. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 204 as shown in FIG. 2. The I/O controller may control one or more I/O devices such as a keyboard and a pointing device, e.g., a mouse or optical pen. Furthermore, an I/O device may also provide storage and/or an installation medium for the computing device. In still other embodiments, the computing device may provide USB connections (not shown) to receive handheld USB storage devices such as the USB Flash Drive line of devices manufactured by Twintech Industry, Inc. of Los Alamitos, Calif.

The computing device may support any suitable installation device (not illustrated), such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device may further include a storage device, such as one or more hard disk drives or redundant arrays of independent disks, for storing an operating system and other related software, and for storing application software programs such as any program or software for implementing (e.g., configured and/or designed for) the systems and methods described herein. Optionally, any of the installation devices could also be used as the storage device. Additionally, the operating system and the software can be run from a bootable medium.

Furthermore, the computing device 250 may include a network interface 202 to interface to a network through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 250 communicates with other computing devices via any type and/or form of gateway or tunneling protocol such as Secure Socket Layer (SSL) or Transport Layer Security (TLS). The network interface 218 may include a built-in network adapter, network interface card, PCMCIA network card, card bus network adapter, wireless network adapter, USB network adapter, modem or any other device suitable for interfacing the computing device to any type of network capable of communication and performing the operations described herein.

In some embodiments, the computing device 250 may include or be connected to one or more display devices. As such, any I/O devices and/or the I/O controller 204 may include any type and/or form of suitable hardware, software, or combination of hardware and software to support, enable or provide for the connection and use of the display device(s) by the computing device. For example, the computing device 250 may include any type and/or form of video adapter, video card, driver, and/or library to interface, communicate, connect or otherwise use the display device(s). In one embodiment, a video adapter may include multiple connectors to interface to the display device(s). In other embodiments, the computing device may include multiple video adapters, with each video adapter connected to the display device(s). In some embodiments, any portion of the operating system 210 of the computing device may be configured for using multiple displays. One ordinarily skilled in the art will recognize and appreciate the various ways and embodiments that a computing device may be configured to have one or more display devices.

In further embodiments, an I/O device may be a bridge between the system bus 208 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a Fibre-Channel bus, a Serial Attached small computer system interface bus, a USB connection, or a HDMI bus.

A device 250 of the sort depicted in FIG. 2 may operate under the control of an operating system 210, which control scheduling of tasks and access to system resources. The device 250 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7, 8, or 10, produced by Microsoft Corporation of Redmond, Wash.; MAC OS and iOS, produced by Apple Computer of Cupertino, Calif.; WebOS, produced by Research In Motion (RIM); OS/2, produced by International Business Machines of Armonk, N.Y.; and Linux, a freely-available operating system distributed by Caldera Corp. of Salt Lake City, Utah, or any type and/or form of a Unix operating system, among others.

As discussed above, the computer system can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system has sufficient processor power and memory capacity to perform the operations described herein.

In some embodiments, the computing device may have different processors, operating systems, and input devices consistent with the device. For example, in one embodiment, the computing device is a smart phone, mobile device, tablet or personal digital assistant. In still other embodiments, the computing device is an Android-based mobile device, an iPhone smart phone manufactured by Apple Computer of Cupertino, Calif., or a Blackberry or WebOS-based handheld device or smart phone, such as the devices manufactured by Research In Motion Limited. Moreover, the computing device can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Applications 208 may comprise any type and form of applications, and may be installed and uninstalled by an installation agent 104. As discussed above, in various implementations, applications 208 may be upgraded either offline or in place. Applications 208 may each comprise a plurality of files, including executable files, libraries, data files, parameter or preference files, registry keys, configuration files, graphics, audio files, video files, dictionaries, templates, or any other type and form of data. An application 208 may exist in a plurality of versions, and may be identified by a version number, name, or other indicator.

As discussed above, the computing device may include a network stack 212, which may be part of the operating system 210 as shown, or may be separate (e.g. considered part of the network interface 202). The network stack 212 may include multiple layers as illustrated in FIG. 1A, and may include a driver for interfacing with a network interface 202. The driver may include queues 104, and may include a buffer controller 130. Buffer controller 130 may comprise an application, service, server, daemon, routine, or other executable logic for managing adaptive buffer sizes. In some implementations, buffer controller 130 may be implemented in an integrated circuit chip, Field Programmable Gate Array (FPGA), or Application Specific Integrated Circuit (ASIC) for additional speed of processing. Buffer 130 may read buffers for packet indicators and manage advancement or retraction of head and tail markers of ring buffers.

In some implementations, network interface 202 may not support flow control, flow control may be disabled, or may be communicating with a device for which flow control is disabled or not supported. Buffer size management as discussed herein may used in absence of flow control mechanisms, enabling the device to deal with high rates of incoming traffic. This avoids packet drops in the receive path by actively monitoring the traffic patterns and adjusting the ring buffer sizes based on the traffic rate.

Figure 3:
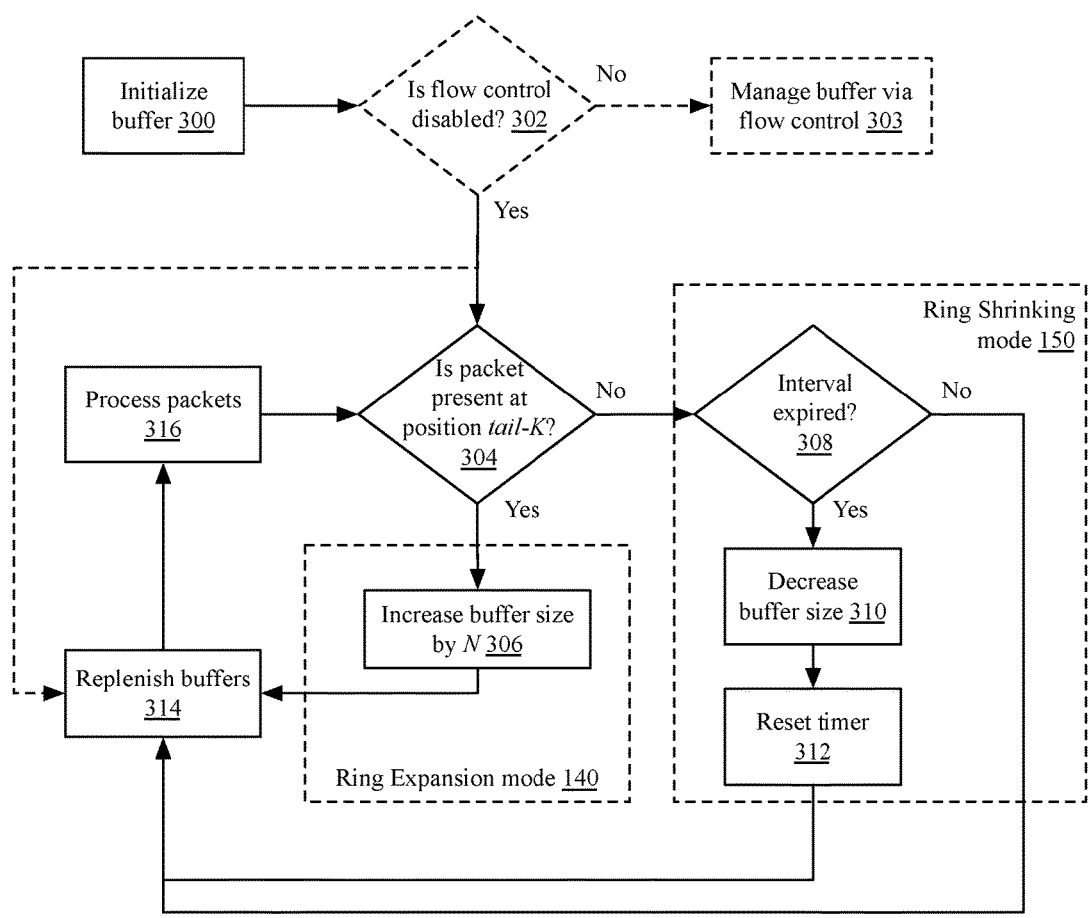
FIG. 3 is a flowchart of a method for adaptive buffer size management.

FIG. 3 is a flowchart of a method for adaptive buffer size management. As discussed above, the method may be applied to a receive buffer for packets arriving at the device and provided upwards from the network interface to the network stack; and may also be applied to a transmit buffer for packets arriving at the buffer from higher layers of the network stack for transmission via the network interface.

At step 300, the buffer may be initialized. Initializing the buffer may include setting the buffer to a predetermined size (e.g. by positioning the tail at a predetermined position K bytes from the head), zeroing out the buffer or erasing data, or otherwise preparing the buffer for use. Initializing the buffer may also include preparing sub-buffers or any other actions necessary for use.

At step 302, in some implementations, the buffer controller may determine if flow control is disabled or not supported. Flow control may be disabled or not supported by the network interface, by a device the network interface is communicating with, etc. If flow control is active (e.g. not disabled), then other flow control methods may be applied at step 303.

If flow control is disabled or if step 302 is skipped, then at step 304, the buffer controller may determine if a packet is present at a position of the buffer corresponding to K bytes from the tail of the buffer. If so, then the buffer has not been drained of packets, or the incoming rate exceeds the drain rate. Accordingly, at step 306, the buffer size may be increased by a predetermined amount (e.g. N bytes). As discussed above, sub-buffers may be enabled or activated or a tail of the buffer may be advanced by an amount greater than advancement of the head (e.g. K+N bytes compared to K bytes). At step 314, the buffer may be replenished with incoming packets (e.g. from the network interface or higher layers of the network stack, and packets may be processed at step 316 (e.g. provided to higher layers of the network stack or the network interface respectively.

In some implementations, the method may proceed directly to step 314 after step 302 (or step 300), as on a first iteration, the buffer will not be full (e.g. skipping steps 308-312, as they would have no effect).

If no packet is present at the position K bytes from the tail at step 304, then at step 308 in some implementations, the buffer controller may determine if a shrink interval timer has expired. If no, then the method may proceed with replenishing the buffer at step 314. This may be done to prevent the buffer from oscillating between expansion and shrinking. If the timer has expired, at step 310, the buffer size may be decreased. As discussed above, sub-buffers may be disabled or inactivated, or a tail of the buffer may be retracted to a position a predetermined distance K bytes from the head (or the head may be advanced by a number of bytes N corresponding to activated sub-buffers while the tail is not advanced, for example). At step 312, the buffer controller may reset the shrink interval timer. The method then may proceed with replenishing the buffers and processing packets at step 314 and 316.

Accordingly, the systems and methods discussed herein provide for dynamic expansion and retraction of buffer sizes based on traffic flow and drain rates.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A system for adaptive buffer size management, comprising:
    a network interface comprising a packet buffer having at least a first predetermined size; and
    a buffer manager configured to:
        determine that a flow control of a connection is disabled,
        determine that a packet of the connection is present in the packet buffer at a position corresponding to the first predetermined size from a tail of the buffer, and
        responsive to the determination that the packet of the connection is present in the packet buffer at the position corresponding to the first predetermined size from the tail of the buffer and the determination that flow control of the connection is disabled, increase the size of the packet buffer by a predetermined value.

2. The system of claim 1, wherein the buffer manager is further configured to:
    subsequently determine that a packet is absent from the packet buffer at the position corresponding to the first predetermined size from the tail of the buffer; and
    responsive to the determination, reduce the size of the packet buffer to the first predetermined size.

3. The system of claim 2, wherein the buffer manager is further configured to reduce the size of the packet buffer by a multiple of the predetermined value to equal the first predetermined size.

4. The system of claim 1, wherein the buffer manager is further configured to:
    subsequently determine that a packet is absent from the packet buffer at the position corresponding to the first predetermined size from the tail of the buffer; and
    responsive to the determination, reduce the size of the packet buffer by the predetermined value.

5. The system of claim 1, wherein the packet buffer comprises a ring buffer.

6. The system of claim 5, wherein the buffer manager is further configured to increase the size of the packet buffer by increasing the ring size.

7. The system of claim 1, wherein the buffer manager is further configured to increase the size of the packet buffer by the first predetermined size.

8. The system of claim 1, wherein the buffer manager is further configured to wait a predetermined period before subsequently determining whether a packet is present in or absent from the packet buffer at the position corresponding to the first predetermined size from the tail of the buffer.

9. The system of claim 1, wherein the network interface lacks hardware flow control.

10. A method for adaptive buffer size management, comprising:
    determining, by a buffer manager of a device, that a flow control of a connection is disabled;
    determining, by the buffer manager, that a packet of the connection is present in a packet buffer of a network interface having a first predetermined size at a position corresponding to the first predetermined size from a tail of the buffer, and
    responsive to the determination that the packet of the connection is present in the packet buffer at the position corresponding to the first predetermined size from the tail of the buffer and the determination that flow control of the connection is disabled, increasing the size of the packet buffer, by the buffer manager, by a predetermined value.

11. The method of claim 10, further comprising:
subsequently determining, by the buffer manager, that a packet is absent from the packet buffer at the position corresponding to the first predetermined size from the tail of the buffer; and
responsive to the determination, reducing the size of the packet buffer, by the buffer manager, to the first predetermined size.

12. The method of claim 11, wherein reducing the size of the packet buffer further comprises reducing the size of the packet buffer, by the buffer manager, by a multiple of the predetermined value to equal the first predetermined size.

13. The method of claim 10, further comprising:
subsequently determining, by the buffer manager, that a packet is absent from the packet buffer at the position corresponding to the first predetermined size from the tail of the buffer; and
responsive to the determination, reducing the size of the packet buffer, by the buffer manager, by the predetermined value.

14. The method of claim 10, wherein the packet buffer comprises a ring buffer.

15. The method of claim 14, wherein increasing the size of the packet buffer further comprises increasing the ring size.

16. The method of claim 10, wherein increasing the size of the packet buffer further comprises increasing the size of the packet buffer, by the buffer manager, by the first predetermined size.

17. The method of claim 10, further comprising waiting a predetermined period, by the buffer manager, before subsequently determining whether a packet is present in or absent from the packet buffer at the position corresponding to the first predetermined size from the tail of the buffer.

18. The method of claim 10, wherein the network interface lacks hardware flow control.

\* \* \* \* \*